No. 783,784.

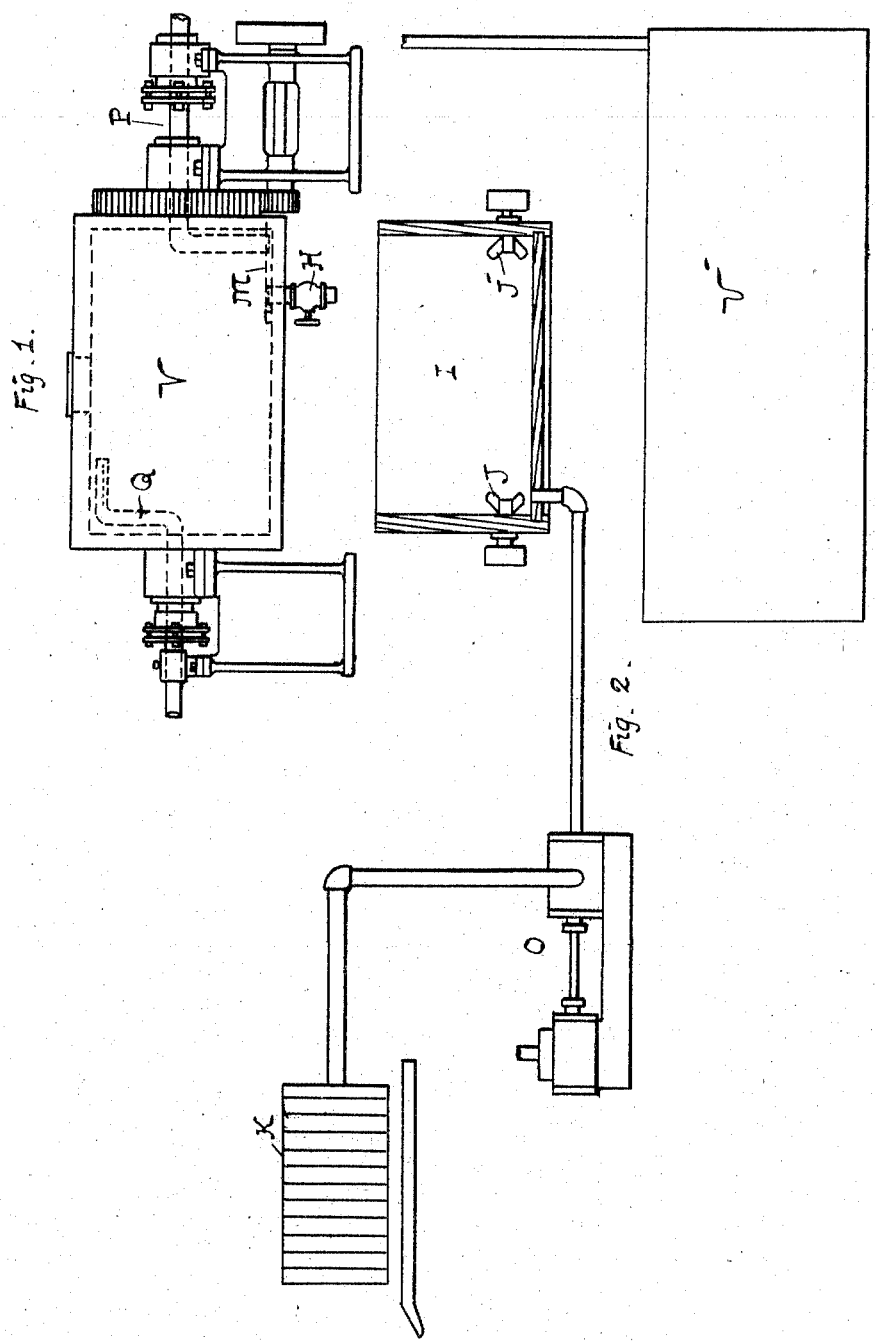

Patented February 28, 1905.

UNITED STATES PATENT OFFICE.

EDWARD R. HEWITT, OF GARDEN CITY, NEW YORK.

METHOD OF TREATING BONES FOR THE PRODUCTION OF GLUE.

SPECIFICATION forming part of Letters Patent No. 783,784, dated February 28, 1905.

Application filed March 7, 1902. Serial No. 97,138.

*To all whom it may concern:*

Be it known that I, EDWARD R. HEWITT, a citizen of the United States, residing at Garden City, in the county of Queens and State of New York, have invented certain new and useful Improvements in Methods of Treating Bones for the Production of Glue, of which the following is a true and full description.

This invention relates to an improved method for producing glue from bones by separating the hard non-glutinous portions of the bones from the glutinous portions by an improved treatment with sulfurous acid and subsequently subjecting the glutinous portion to a proper treatment to form a commercial glue therefrom.

The apparatus for carrying out my new process is illustrated in the accompanying drawings, in which—

Figure 1 is an elevation of the vat in which the stock is treated. Fig. 2 is a diagrammatic illustration of the apparatus which may be employed for the refining treatment of the glue-liquor.

The invention may be described in detail as follows: After the bones have been subjected to a short preliminary treatment, such as boiling, to remove the superficial impurities, such as grease and other chemically free matter not a part of the bone structure, they are subjected to the separating treatment. The acid used in the treatment of the bones according to my process is preferably approximately a twelve-per-cent. solution of sulfurous acid in water. The preparation of such a solution, as is well known, generates considerable heat. It is desirable, as further described hereinafter, to keep down the temperature during the separating treatment. I therefore form the necessary mixture of sulfurous acid and water in any vessel or chamber adapted to the purpose and cool the mixture before it is applied to the bones. In my application, Serial No. 97,137, filed March 7, 1902, I have described an apparatus adapted to be used in connection with the present method to recover the sulfurous acid and to again mix it with water for a second application to the bones. The present method is, however, entirely independent of the source of the acid used. It is only necessary that the acid should be mixed with the water and the resulting heat dissipated before application to the bones. The separating treatment takes place in the vat V, (shown in Fig. 1,) the vat being adapted to rotate about once a minute by any suitable means, such as the gears shown. About ten thousand pounds of bones are first shoveled into the vat V from a suitable platform (not shown) above the manhole in the vat, and the previously-prepared cold aqueous sulfurous acid is introduced on the bones in the vat V through the axial pipe P, in sufficient quantity to cover the bones. The pipe P has an elbow extending down below the screen M, said pipe and elbow being revolved with the vat. There will be immediately a generation of a large amount of carbon dioxid, which carries with it considerable sulfurous acid. The acid is saved and danger of explosion is averted by providing exit through the elbowed axial pipe Q, which is stationary and does not revolve with the vat, the result being that its opening is always at the open space at the top of the vat above the bones and aqueous acid. The pipe Q should be connected with the sulfurous-acid tower (not shown) where the carbon dioxid is permitted to escape, while the sulfurous acid mixes with the like acid which is made in the tower. The rotation of the vat V causes the mass of stock to be tumbled about in the aqueous acid, thus preventing the collecting of bubbles of carbon dioxid on the surface of the bones and preventing the bones from becoming closely packed together, thereby facilitating the action of the acid and accomplishing the separation in one-third the time required in a stationary vat. This reduces the number of treatments and the amount of acid which would otherwise be required. At the same time that the carbon dioxid is liberated the acid begins to combine with the phosphates and sulfites in the bones. The excess of water of the aqueous acid serves as a dialyzing agent to carry the acid into the innermost recesses of the bones, to act on every portion of the calcium contained therein, to kill the bacteria, and to partially hydrate the gelatinous substances to facilitate their subsequent dissolution in hot water. It also serves as a solvent for the calcium salts which are formed by the combination with the acid. This chemical combination causes a rise in temperature, which would be over 74° Fahrenheit, the temperature at which the gelatin would flow and be mixed with the solution if the aqueous acid had not been previously cooled. The gelatin will flow very freely at 80° Fahrenheit and its quality be injuriously affected at such high temperature, and I have found that the aqueous acid should be previously cooled to a temperature (dependent upon quantitative conditions) which will result in keeping the temperature of the acid down below 70° Fahrenheit during its action on the bones. It is important not only that each successive separating treatment should be conducted at a low temperature, but that it be terminated as speedily as possible, as the tendency of the gelatin to render increases directly in proportion to the rise in temperature caused by the extended duration of each treatment. The time might of course be shortened by increasing the strength of the aqueous acid; but if this is made too strong it will attack the gelatinous substances and injure the quality of the final product or in extreme cases result in decomposition. Furthermore, it is impracticable to make a very strong aqueous acid on account of the extended time necessary for the absorption of large quantities of the gas by water at atmospheric pressure, which is the pressure at which this work can be best done in practice. The water will absorb readily only eleven or twelve per cent. of the acid at ordinary temperatures and pressures. On the other hand, if the aqueous acid be made very weak it will not combine with very large quantities of the calcium in the bones, and it will not be economical to separate the acid-gas from the solution so weakly saturated with the resulting salts for succeeding applications to the bones, owing to the large amount of water and the consequent increase in the amount of heat necessary for the subsequent separation of the acid-gas. It is between these two limits, therefore, that I have found the separating treatment can be best carried out in a practical and commercial manner; and, as stated above, the aqueous acid should contain about twelve per cent. of acid. After the aqueous acid has acted for a short time its tendency to combine with the calcium of the bones is partially satisfied, and I have found that after this quick saturation to a certain degree it takes a very much longer proportionate time for the solution to be entirely saturated. It is disadvantageous to attempt to continue the separation of the gelatin by leaving the solution on the bones after the acid ceases to combine readily with the calcium, owing to the fact that if this were done the temperature would reach too high a degree and the gelatin would flow or its quality be impaired, although the extraction of the heat of absorption from the aqueous acid before it is applied to the bones enables each quantity of the acid to remain on the bones a longer time without affecting the gelatinous substances than it could otherwise and enables the aqueous acid to combine with a larger amount of the calcium before the solution becomes hot enough to affect the gelatin. Furthermore, if the solution were left on the bones after it had become fully saturated with salts the latter would precipitate and be deposited in the pores of the bones in the form of a much less readily soluble precipitate, so that further separation of the gelatin would not be possible within a reasonably short time at the low temperature and with the relatively weak aqueous acid required. It is, however, quite important that the solution should be as nearly saturated with the salts as practicable in order that the amount of solution from which the acid-gas is to be separated for the succeeding treatment may be as small as possible. I have found that if an aqueous acid of a strength (about twelve per cent.) which it is practicable to prepare in a short time is applied to a mass of bones the gelatinous substances will not be completely separated even when such a solution is completely saturated. In order to prevent the deposition of insoluble salts which would plug up the pores of the bones and in order to shorten the time of each separating treatment by not leaving the solution on the bones after the acid begins to combine but slowly with the calcium, I draw off the partially-saturated solution by pumping it through the pipe P into the storage-vat V', and then another quantity of aqueous acid, formed as described, is introduced on the partially-treated bones in the vat V through the pipe P by the valve B from the tank F to effect a continuation of the separation of the non-gelatinous substance. This second quantity of aqueous acid may be formed from the gas which is liberated from the solution containing the calcium salts instead of the gas from the tower (in which gas is made in any well-known manner) by heating the said solution directly with open steam in a manner described in my application, Serial No. 97,137, filed March 7, 1902. This second treatment results in the further separation of the hard non-gelatinous substances, and I find that it is desirable to repeat the separating treatment several times until substantially all of the phosphates and sulfites are freed from chemical combination in the bones. The quantity of aqueous acid applied in each successive treatment or "run," as I call it in practice, is saturated to a less degree than the previous one, owing to the gradually-increasing dialytic resistance of the increased exposed mass of the gelatinous substances. When a certain run is reached wherein the solution is so weakly saturated that the cost of separation of the acid-gas from it would be relatively too great, owing to the excess of water and the necessity for the application of an excessive amount of heat, the liquor of this run is used for the first application to a fresh quantity of bones the separation of the gelatinous substance from which has not been begun. By thus employing a partially-saturated acid solution upon the fresh mass of bones a too sudden evolution of carbonic-acid gas is prevented, thus avoiding the danger from explosion which would exist if there were applied to the bones an unsaturated solution containing only a small percentage of acid. Since in a fresh quantity of bones there are large exposed surfaces of the calcium salts in combination, even this partially-saturated solution from a previous treatment will quickly become saturated to the degree at which separation of the acid-gas from it can be cheaply accomplished and at which it should be drawn off from the bones. I have found that by thus using for the first treatment of the bones the liquor which had been used for the later treatment of other bones there is required about thirty per cent. less weight of the aqueous acid for properly treating a given weight of bones. This of course greatly reduces the amount of the aqueous acid from which it is necessary to separate the acid-gas. This amount is nearly as low as the theoretical amount required, which shows that the operation is nearly perfect. If the separating treatments are conducted as described, about ninety-five per cent. of the bone-ash will be carried off, and hence only a very small portion of the ash will remain in the gelatinous cartilage.

The storage-vat V' should be of sufficient capacity to contain successive charges of the solution drawn off from the bones in the vat V, so that the pump U (shown in the lower right-hand corner of Fig. 3) may be operated continuously, if desired. The pump U forces the solution from the storage-vat V' into the apparatus where the acid-gas is separated from the solution, and subsequently a cool aqueous acid is made in the manner described in my application, Serial No. 97,137, above referred to, in preparation for the continuation of the separation of the non-gelatinous substances from the bones.

After the several successive treatments of the bones with the aqueous acid have been completed the gelatinous substances remain in the vat V in the form of yielding springy pieces resembling soft rubber in consistency. A quantity of fresh water is then introduced into the vat V through the pipe P, and the vat is rotated for the purpose of washing the bones to remove the excess of acid, or the bones may be partially neutralized for the same purpose. A little acid should be left to serve as a vehicle to complete during the glue-rendering operation the hydration which is begun during the separating treatments, so that the gelatinous substances will dissolve more quickly. The mass of bones after being washed or neutralized is then ready for the glue-rendering operation, wherein the gelatinous substances are put in solution. The cartilage resulting from the separating treatments besides being in perfect condition for the glue-rendering operation is also valuable as a commercial product to be sold to the trade for glue-rendering at some future time. To render the gelatinous substances, they are put into solution in water below boiling temperature, which results in a product of greatly-improved quality. Hitherto it has been customary to boil the water in which the gelatinous substances of the bones are put in solution and to prolong the operation for a considerable time. This has been necessary because the gelatinous substances have not been entirely separated from the calcium, and therefore could not have been partially hydrated throughout for the purpose of hastening the dissolution of the tissues. The raising of thousands of pounds of stock to boiling temperature naturally required considerable time when the stock had not been previously hydrated. The boiling temperature also served to kill the bacteria, which must be accomplished at some time, as they would otherwise injure the tensile strength and darken the color of the glue and shorten its life after it has been treated for use in practice with water, which would serve to propagate the bacteria. A temperature in water of at least 160° Fahrenheit is necessary to kill the bacteria. I have found that a temperature of 150° and higher will injure the quality of the glue in solution in an acid state and that a prolongation of the rendering operation will permit considerable bacteriological rotting to take place if there are any bacteria in the stock when it goes to the rendering operation. It is of course advantageous to quick rendering to conduct the operation at a temperature as near 150° as is possible without injuring the quality of the resulting product. Since the gelatinous substances separated from the bones in accordance with this invention are substantially free from calcium and are partially hydrated throughout by the excess of water in the aqueous acid, I am enabled to put the substances in solution in water which is not boiling, but which is preferably heated up to nearly 150° Fahrenheit. The slight amount of acid left in the stock from the separating treatments will not injure the glue, I have found, if there is no more acid than the glue will combine with. On the contrary, I have found that such a small amount of acid is advantageous as a vehicle to assist in the hydration of the substances, and thus hasten the rendering operation. If there is an excess of acid, the product will be brittle in the jelly. The product of the rendering operation is a glue solution containing various impurities which could not conveniently be removed previously. This solution is drawn off from the rotating vat V through the valve H into the clarifying-tank I. The pipe controlled by the valve H leads into the rotating vat beneath the screen M, so that the larger impurities will not be transferred to the tank I. An alkaline earth is added to the glue solution in the tank I and is thoroughly mixed by means of the stirrers J, operated by suitable pulleys. This operation neutralizes the solution and precipitates the impurities, which are finally separated from the pure glue solution by a filter-press K, to which the solution, with the impurities in suspension, is forced by the pump O. The pure glue solution is then ready to be evaporated, jellied, dried, and cut in any well-known manner.

I am aware of the English Patents No. 4,356 of 1883 to Lake, No. 15,664 of 1885 to Schroeder, No. 1,914 of 1863 to Gerland, No. 1,422 of 1868 to Gerland, No. 3,820 of 1814 to Mertian, No. 7,661 of 1838 to Rattray, and of the United States patent to Schroeder, No. 518,861.

I claim as my invention—

1. The improvement in the art of treating bones for the production of glue, which consists in subjecting the bones to treatment with successive quantities of combined sulfurous acid and water, from which the heat of combination has previously been dissipated, and terminating each treatment before the bone salts precipitate and before the temperature rises above 74° Fahrenheit, substantially as described.

2. The method of removing bone salts from bones for the production of glue, which consists in flooding the bones with a solvent comprising combined sulfurous acid and water, drawing off the solvent from the bones before the bone salts dissolved therein precipitate, whereby a portion of the bone salts is removed from the bones, again flooding the bones with a second quantity of the said solvent, and again withdrawing the solvent before the bone salts precipitate, for the further removal of the bone salts, and continuing such treatment until the bone salts are sufficiently removed, substantially as described.

3. The method of removing bone salts from bones for the production of glue, which consists in flooding the bones with a solvent comprising combined sulfurous acid and water from which the heat of combination has previously been dissipated, removing the solvent before the temperature rises above 74° Fahrenheit, whereby a portion of the bone salts is removed, again flooding the bones with a second quantity of the said solvent, and again withdrawing the solvent before the temperature rises above 74° Fahrenheit, for the further removal of the bone salts, and continuing such treatment until the bone salts are sufficiently removed, substantially as described.

In witness whereof I have hereunto signed my name this 21st day of February, 1902.

EDWARD R. HEWITT.

In presence of—
  JAMES J. COSGROVE,
  W. H. BERRIGAN.